US00RE50509E

(19) United States
(12) Reissued Patent
Handfield

(10) Patent Number: US RE50,509 E
(45) Date of Reissued Patent: Jul. 29, 2025

(54) CONVEYING ASSEMBLY FOR SNOWMAKING APPARATUS

(71) Applicant: INDUSTRIES SNÖFLAKE INC., Lévis (CA)

(72) Inventor: Louis Handfield, Quebec (CA)

(73) Assignee: INDUSTRIES SNOFLAKE INC., Levis (CA)

(21) Appl. No.: 17/742,574

(22) Filed: May 12, 2022

Related U.S. Patent Documents

Reissue of:
(64) Patent No.: 11,092,373
Issued: Aug. 17, 2021
Appl. No.: 16/082,516
PCT Filed: Mar. 7, 2017
PCT No.: PCT/CA2017/000043
§ 371 (c)(1),
(2) Date: Sep. 5, 2018
PCT Pub. No.: WO2017/152260
PCT Pub. Date: Sep. 14, 2017

U.S. Applications:
(60) Provisional application No. 62/389,700, filed on Mar. 7, 2016.

(51) Int. Cl.
*F25C 3/04* (2006.01)
*B05B 7/14* (2006.01)
(Continued)

(52) U.S. Cl.
CPC ..... *F25C 3/04* (2013.01); *B05B 7/1404* (2013.01); *B65G 53/14* (2013.01); *B65G 53/16* (2013.01);
(Continued)

(58) Field of Classification Search
CPC ..... B65G 53/14; B65G 53/16; B65G 53/42; B65G 53/4625; B65G 53/52; E01H 4/02
See application file for complete search history.

(56) References Cited

U.S. PATENT DOCUMENTS 1,751,343 A * 3/1930 Mack ..... E04F 21/12 427/421.1
2,545,829 A * 3/1951 Spreng ..... A01M 9/0092 406/61
(Continued)

FOREIGN PATENT DOCUMENTS

CA 1243851 11/1988
CA 1273380 A * 8/1990 ..... B65G 53/50
(Continued)

OTHER PUBLICATIONS

Extended European Search Report issued Jan. 24, 2020 in connection with European Patent Application No. 17762357.6.
(Continued)

*Primary Examiner* — William E Dondero
(74) *Attorney, Agent, or Firm* — CASSAN MACLEAN IP AGENCY INC.

(57) ABSTRACT

A snow conveying assembly for use with a snow making machine includes an impeller for receiving snow from the snow making machine and accelerating the snow; and an ejector tube, which receives the snow from the impeller, further accelerates the snow and discharges the snow from the assembly. The ejector tube contains a venturi throat. Snow from the impeller is conveyed via a snow inlet tube into the ejector tube immediately upstream of a venturi throat and air under pressure is blown into the ejector tube upstream of the venturi throat to further accelerate the snow.

4 Claims, 5 Drawing Sheets

(51) Int. Cl.

| | |
|---|---|
| ***B65G 53/14*** | (2006.01) |
| ***B65G 53/16*** | (2006.01) |
| ***B65G 53/42*** | (2006.01) |
| ***B65G 53/46*** | (2006.01) |
| ***B65G 53/52*** | (2006.01) |

(52) U.S. Cl.

CPC ..... *B65G 53/42* (2013.01); *B65G 53/4625* (2013.01); *B65G 53/52* (2013.01); *B65G 2201/04* (2013.01); *F25C 2303/046* (2013.01)

(56) References Cited

U.S. PATENT DOCUMENTS

| | | | | | |
|---|---|---|---|---|---|
| 2,676,471 | A * | 4/1954 | Pierce, Jr. | F25C 3/04 | 62/304 |
| 3,257,815 | A * | 6/1966 | Brocoff | F25C 3/04 | 62/57 |
| 3,945,567 | A | 3/1976 | Rambach | | |
| 4,050,169 | A * | 9/1977 | Pasquier | B65G 53/08 | 37/219 |
| 4,538,369 | A * | 9/1985 | Pasquier | F25C 3/04 | 37/219 |
| 4,597,524 | A | 7/1986 | Albertsson | | |
| 5,230,218 | A | 7/1993 | Clulow | | |
| 6,334,327 | B1 * | 1/2002 | Fujiwara | B02C 13/08 | 62/320 |
| 2004/0144852 | A1 | 7/2004 | Bucceri | | |
| 2005/0035210 | A1 | 2/2005 | Bucceri | | |
| 2010/0202834 | A1 * | 8/2010 | Leitner | E01H 4/02 | 37/223 |
| 2014/0215842 | A1 | 8/2014 | Hogan | | |

FOREIGN PATENT DOCUMENTS

| | | | | | |
|---|---|---|---|---|---|
| DE | 2507795 | A * | 8/1975 | B65G 31/04 | |
| DE | 102013113275 | A1 | 6/2015 | | |
| GB | 2042641 | A | 9/1980 | | |
| GB | 2248921 | | 4/1992 | | |
| JP | S5596400 | A | 7/1980 | | |
| JP | 01312371 | A * | 12/1989 | F25C 3/04 | |
| JP | 05302307 | A * | 11/1993 | | |
| JP | 10160310 | A | 6/1998 | | |
| JP | H10160310 | A | 6/1998 | | |
| JP | 2002130882 | A * | 5/2002 | F24C 2303/042 | |
| JP | 2003322443 | A | 11/2003 | | |
| JP | 3074425 | U | 1/2011 | | |

OTHER PUBLICATIONS

International Search Report issued in respect of PCT International Patent Application No. PCT/CA2017/000043, dated May 19, 2017.

* cited by examiner

CONVEYING ASSEMBLY FOR SNOWMAKING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

This invention relates to a conveying assembly for use in an apparatus for producing artificial snow.

BACKGROUND OF THE INVENTION

The most common snowmaking apparatuses in use today include a compressed air type and a fan type. In a compressed air apparatus, air and water are supplied to snow guns for atomizing, projecting and conveying of an air/water mixture. The fan type apparatus includes a large tubular casing containing a fan for producing a large volume of air. Water is atomized hydraulically and injected into the airstream produced by the fan. Direct nucleation is required with this type of apparatus. A problem with compressed air and fan type apparatuses is that they can produce snow only at temperatures from below to slightly above 0° C.

Relatively recently, flake ice machines have been used to make snow. Such flake ice machines are available from North Star, Seattle Wash., USA, Howe Corporation, Chicago, Ill., USA and GEA, France. Flake ice machines have the advantage that they can produce snow at temperatures up to approximately 25° C. However, flake ice type apparatuses for making and depositing snow on a ski area are relatively large including many components, namely the usual compressors, condensers and evaporators for making the snow, and pneumatic conveyors using powerful blowers for depositing the snow on the ski area. The apparatuses are formed of modules which are expensive to transport and assemble on site at great expense. In fact, a crane is required to assemble such flake ice type apparatuses. Accordingly, not only must the components of the apparatus be transported to remote locations, but a crane must be rented, transported to the site, assembled, disassembled and returned to the rental location, all of which can be labour intensive and very expensive. Moreover, the use of powerful blowers in existing apparatuses to increase velocity and pressure is accompanied by a temperature increase, which adversely affects the snow. With a large blower, it is necessary to cool the air supplied to the blower to lower the air temperature.

BRIEF SUMMARY OF THE INVENTION

The present invention provides a solution to the above-identified problems in the form of a relatively efficient assembly for conveying snow produced in an flake ice machine to a hill or other terrain. The assembly can be part of a snowmaking apparatus which can be preassembled in a factory and shipped to a site, where it can be offloaded as a unit and immediately put to work. Alternatively, the apparatus can be loaded onto a trailer, towed to a site, and remain on the trailer during use. Moreover, the conveying assembly of the present invention requires a relatively small blower with little temperature increase to the air and consequently to the snow.

In accordance with one aspect, the present invention provides a snow conveying assembly for use with a snow making machine comprising:

an impeller for receiving snow from the snow making machine and for accelerating the snow;

an ejector tube having an inlet end for receiving snow from said impeller, a venturi throat downstream of said inlet end in the direction of snow travel through the ejector tube, and an outlet end for discharging snow from the conveying assembly;

a snow inlet tube for introducing snow from said impeller into said ejector tube immediately upstream of said venturi throat in the direction of snow travel through the ejector tube;

an air inlet in the inlet end of said ejector tube upstream of said venturi throat;

said snow inlet tube having a discharge end spaced apart from the venturi throat, creating a small gap between said discharge end and the venturi throat, whereby, when air under pressure passes through said gap and then through said venturi throat, the resulting snow and air mixture is accelerated out of said outlet end of the ejector tube.

BRIEF DESCRIPTION OF THE DRAWINGS

The invention is described in greater detail with reference to the accompanying drawings, which illustrate a preferred embodiment of the invention, and wherein.

DETAILED DESCRIPTION OF THE INVENTION

Figure 1:
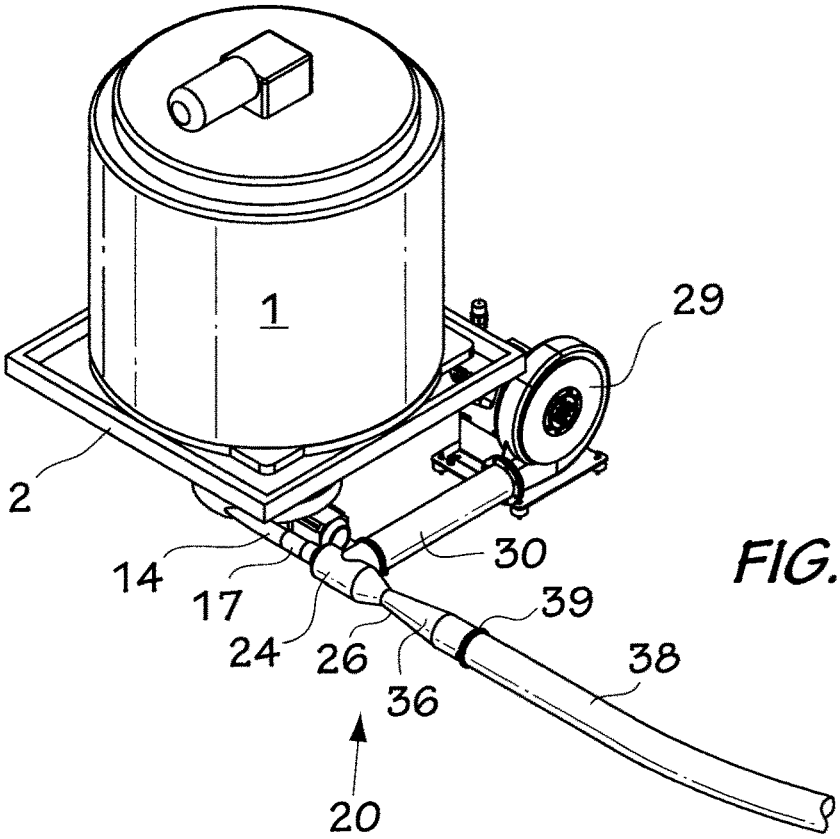
FIG. 1 is an isometric view from one side of part of a snowmaking apparatus incorporating one embodiment of the conveying assembly of the present invention.
Figure 2:
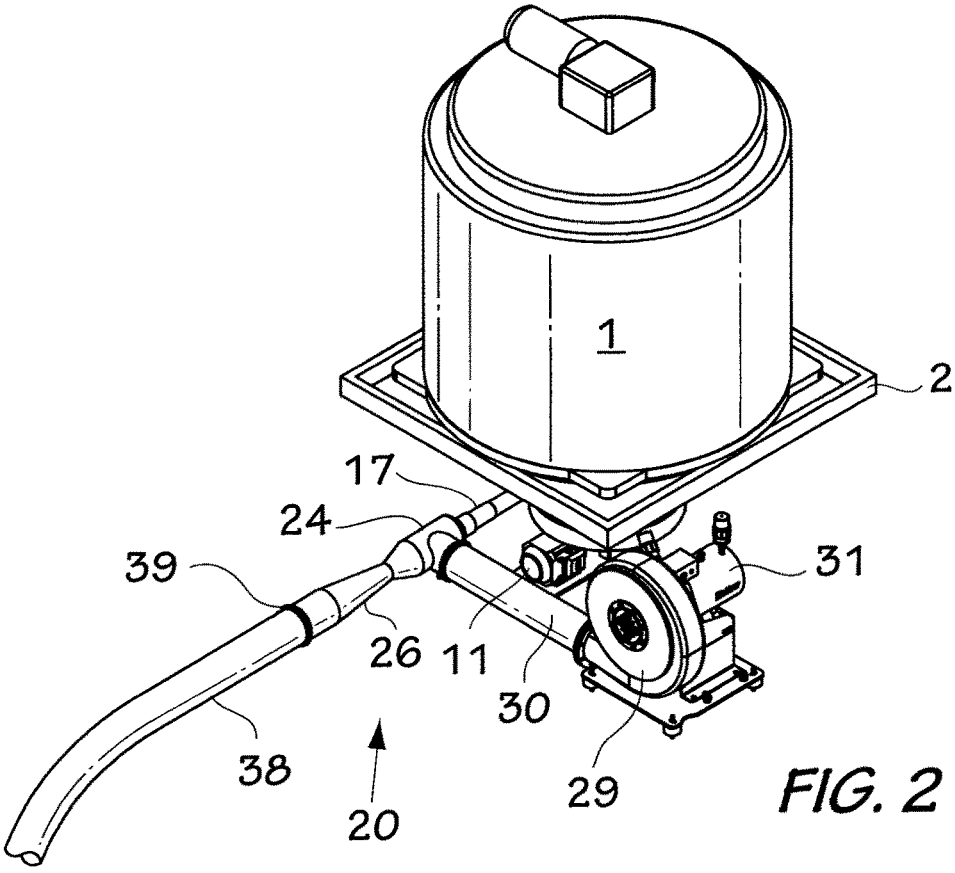
FIG. 2 is an isometric view from a second side of the snowmaking apparatus of FIG. 1.
Figure 3:
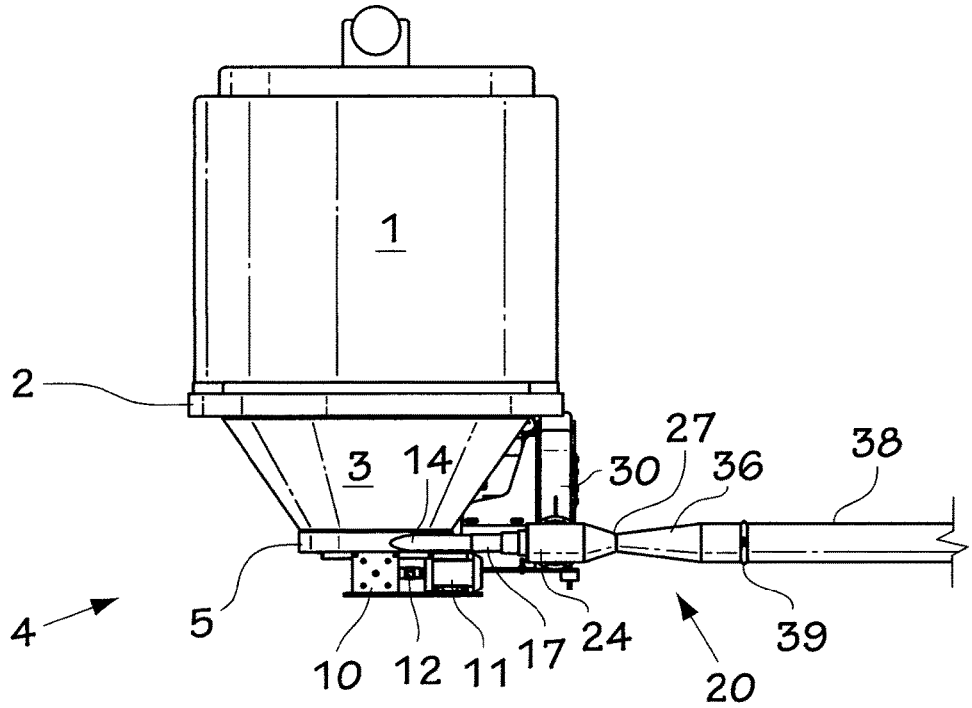
FIG. 3 is a front view of the apparatus of FIGS. 1 and 2.

With reference to FIGS. 1 to 3, the conveying assembly of the present invention forms part of a snowmaking apparatus which includes an off-the-shelf flake ice evaporator 1 mounted on a platform 2. The evaporator 1 is connected to a refrigeration unit (not shown) which includes a water supply, compressors and a condenser. Snow produced in the evaporator 1 is discharged through the frustro-conical bottom, outlet end 3 of the evaporator into an impeller indicated generally at 4, which forms part of the conveying assembly of the present invention.

Figure 4:
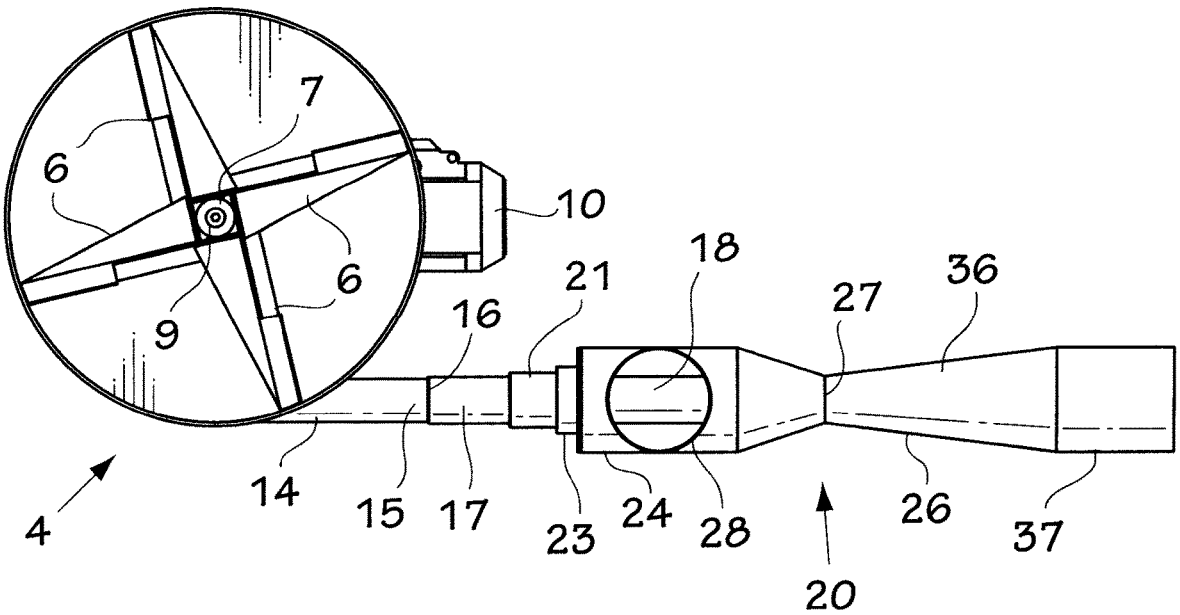
FIG. 4 is a top view of one embodiment of the conveying assembly of the present invention.
Figure 5:
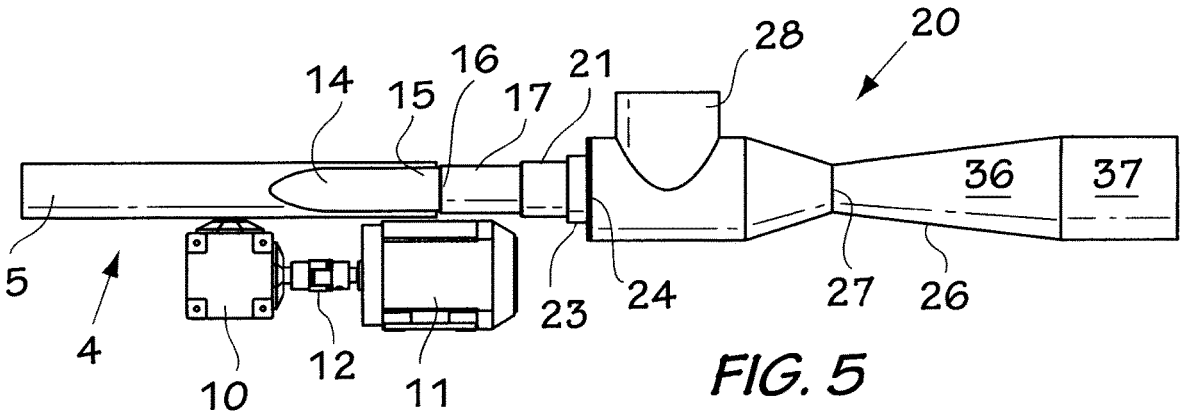
FIG. 5 is a side view of the conveying system of FIG. 4.
Figure 6:
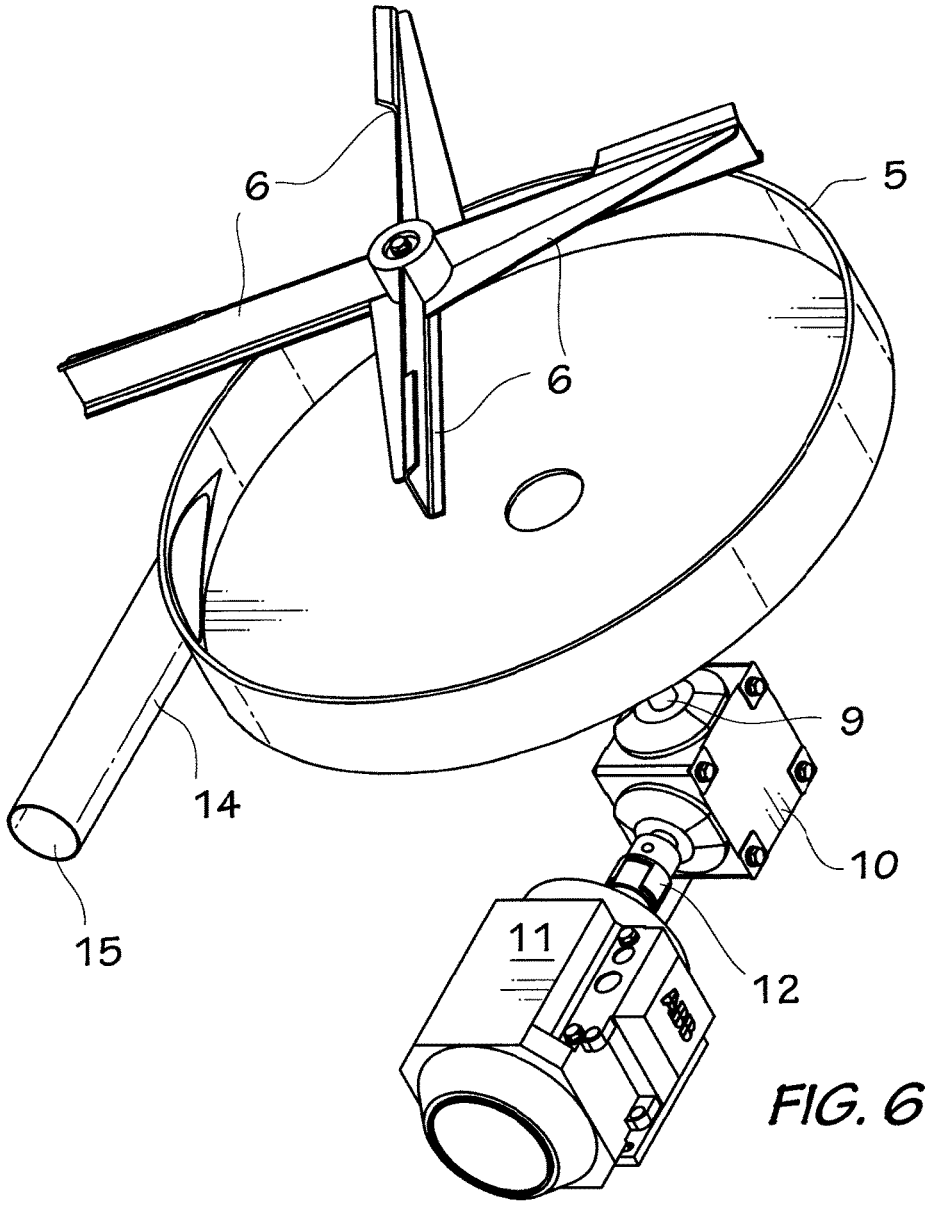
FIG. 6 is an exploded isometric view of the inlet end of the conveying assembly of FIGS. 3 and 5.

As best shown in FIGS. 4 to 6, the impeller 4 includes a tray 5 mounted under the outlet end 3 of the evaporator 1. The tray 5 contains four blades 6 extending radially outwardly from a hub 7. The hub 7 is mounted on the shaft 9 of a transmission in the form of a 90° gearbox 10. The gearbox 10 is connected to an electric motor 11 by a U-joint 12. Thus, the gearbox 10 and the motor 11 serve to rotate the blades 6 at high speed to partially regrind snow received from the evaporator 1 and to drive the snow tangentially out of the tray 5 through an outlet pipe 14. The downstream end 15 of the pipe 14 is connected to the inlet end 16 (FIGS. 4 and 5) of a snow inlet tube 17.

Figure 7:
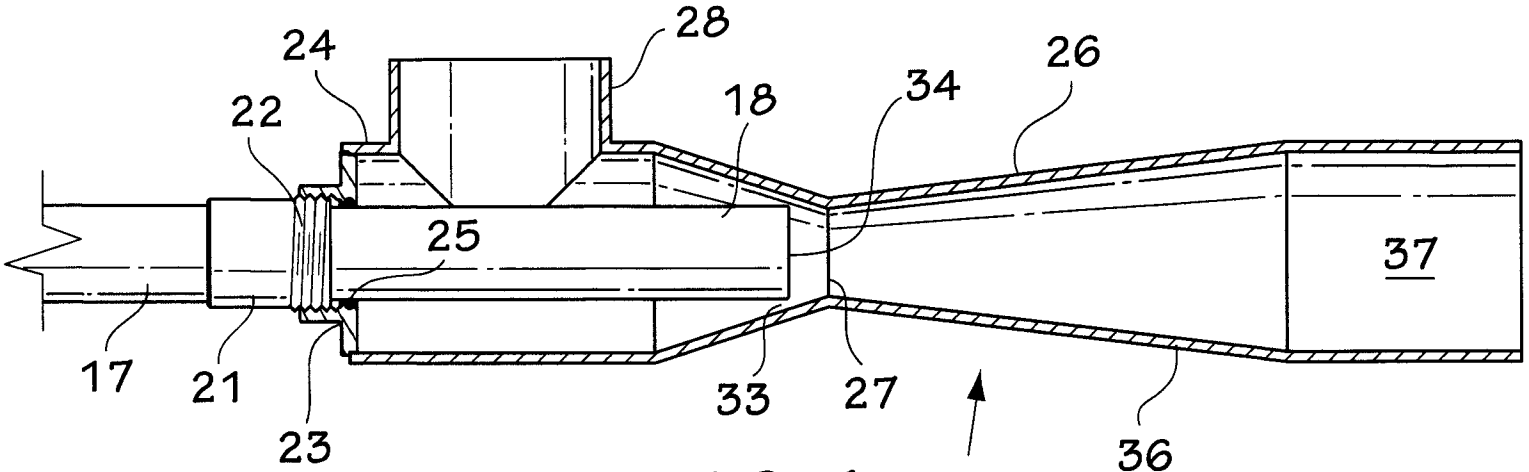
FIG. 7 is an exploded isometric view of the outlet end of the conveying assembly.
Figure 8:
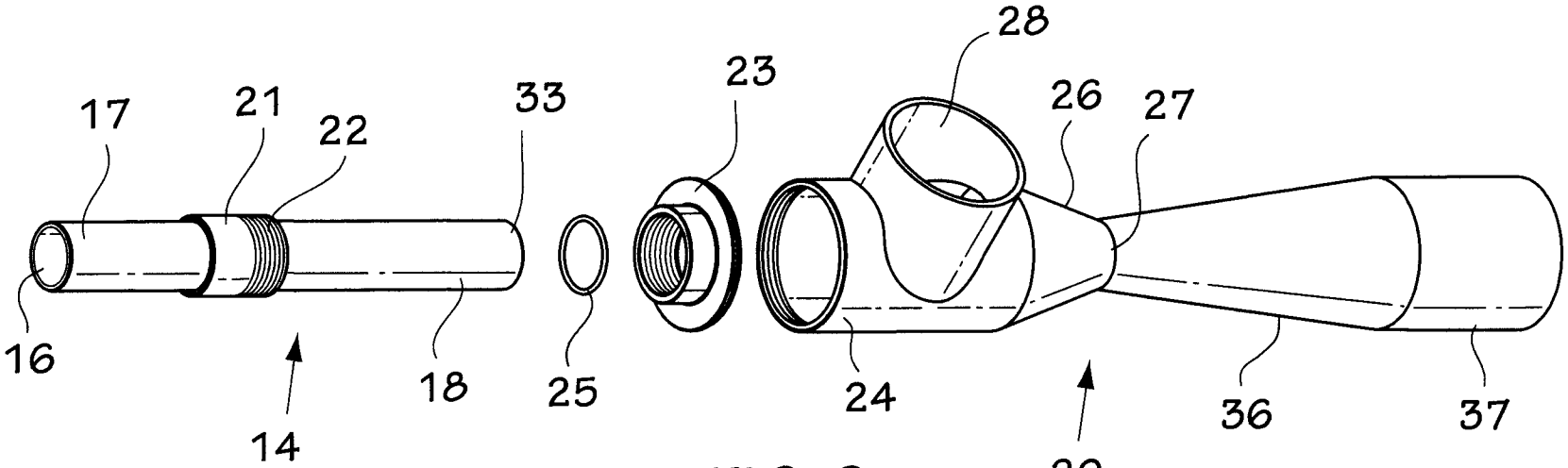
FIG. 8 is a longitudinal sectional view of the outlet end of the conveying assembly.

As best shown in FIG. 7, the downstream end 18 of the tube 17 extends into an ejector tube indicated generally at 20. A sleeve 21 is welded onto the snow inlet tube 17. The externally threaded downstream end 22 of the sleeve 21 is threaded into an internally threaded, annular coupler 23, which is mounted in the cylindrical inlet end 24 of the ejector tube 20. An O-ring 25 seals the tube 17 in the ejector tube 20. Thus, the length of the tube 17 extending into the ejector tube 20 can be adjusted by rotating the sleeve 21 and the tube 17 as a unit relative to the coupler 23 and the ejector tube. The inlet end 24 of the ejector tube 20 is followed by a venturi section 26 including a throat 27.

Air under pressure is introduced radially into the cylindrical end 24 of the ejector tube 20 via an inlet 28, which is connected to a centrifugal fan 29 (FIGS. 1 to 3) by a pipe 30. The fan 29 is driven by a motor 31 (FIG. 2). The venturi throat 27 downstream of the air inlet 28 receives snow from the impeller 4 via the inlet tube 17 and air from the pipe 30. The exit end 33 of the snow inlet tube 17 is located a short distance upstream of the throat 27 and considerably downstream of the air inlet 28. Changing the length of the snow inlet tube 17 extending into the ejector tube 20 adjusts a gap 34 between the exit end 33 of the tube and the venturi throat. Once they pass through the throat 27, the snow and air are discharged through a frusto-conical section 36 of the venturi section 26 and a cylindrical outlet end 37 of the tube 20. The outlet end 37 has the same diameter as the large diameter inlet end 24 of the ejector tube 20. A long hose 38 (FIGS. 1, 2 and 9) is connected to the outlet end 37 of the tube 20 by a hose clamp 39 for conveying the snow and air a large distance from the apparatus.

During operation, snow produced in the flake ice machine evaporator 1 falls into the impeller tray 5. The snow is partially reground in the impeller 4 and driven tangentially from the impeller by the blades 6. The snow passes through the snow inlet tube 17 and into the venturi section 26 of the ejector tube 20. Air entering the ejector tube 20 via the pipe 30 surrounds the column of snow, forming a tubular stream around the snow. The air and snow are discharged from the ejector tube 20 and the hose 38. Because of the kinetic energy imparted to the snow by the impeller 4, and passage through the annular jet pump defined by the snow inlet tube 17 and the ejector tube 20, the snow is driven a much larger distance from the conveying assembly and uses considerably less energy than existing apparatuses. In other words, the impeller 4 drives the snow into the ejector tube 20 at a first speed, e.g. 100 kilometers per hour, and the air entering the ejector 20 and passing through the venturi throat accelerates the snow to a higher speed of as much as 400 kph. With existing apparatuses utilizing pneumatic conveying only, a tremendous amount of energy would be required to achieve the same result.

Figure 9:
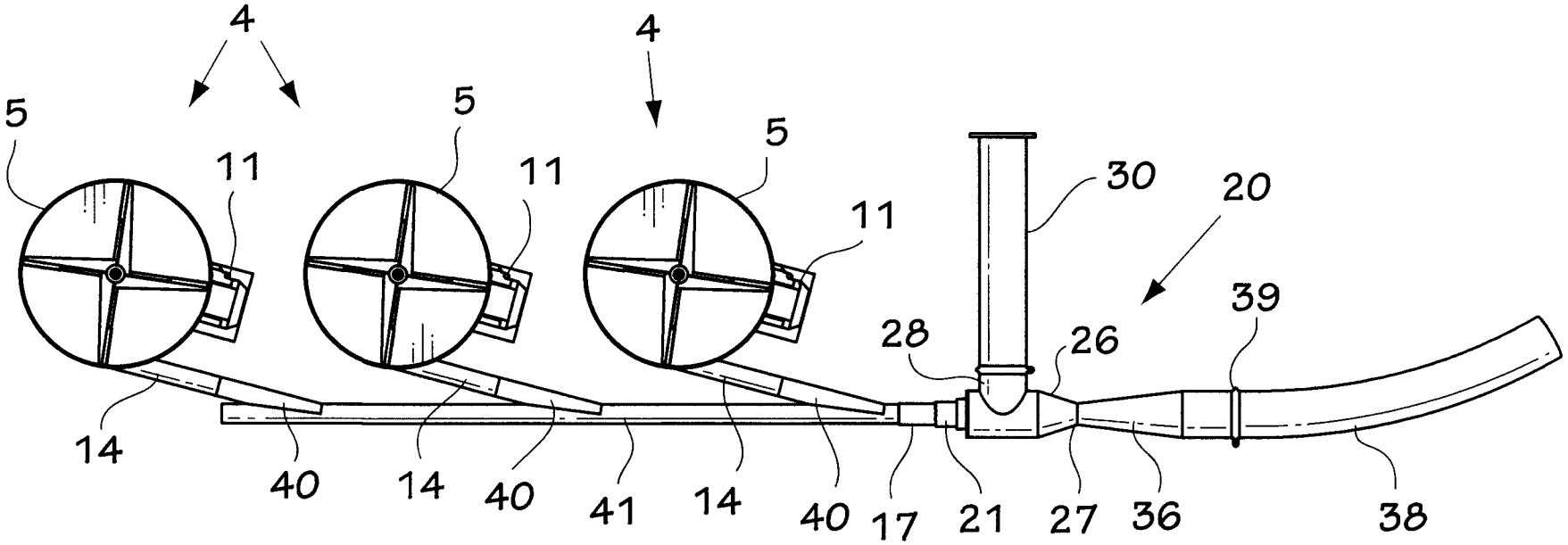
FIG. 9 is a top view of a second embodiment of the conveying assembly of the present invention.

Referring to FIG. 9, in accordance with a second embodiment of the invention, a plurality of impellers 4 are used to receive snow from a similar number of flake ice evaporators (not shown). The snow is fed through extensions 40 of the impeller outlet pipes 14 and an extension 41 of the snow inlet tube 17 into a single ejector tube 20.

Another possible apparatus for feeding snow into the impeller includes a screw conveyor (not shown) for receiving the snow from one or more evaporators, and a funnel (not shown) beneath the discharge end of the screw conveyor for feeding the snow into the impeller.

The invention claimed is:

1. A snow conveying assembly for use with a snow making machine comprising:

an impeller for receiving snow from the snow making machine and for accelerating the snow;

an ejector tube having an inlet end for receiving snow from said impeller, a venturi throat in said tube downstream of said inlet end in the direction of snow travel through the ejector tube, and an outlet end for discharging snow from the conveying assembly;

a snow inlet tube extending into the ejector tube for introducing snow from said impeller into said ejector tube immediately upstream of said venturi throat in the direction of snow travel through the ejector tube;

an air inlet in the inlet end of said ejector tube upstream of said venturi throat; and a fan for introducing air under pressure through said air inlet into said inlet end of the ejector tube;

said snow inlet tube having a discharge end spaced apart from the venturi throat, creating a small gap between said discharge end and the venturi throat, whereby, when the air under pressure passes through said gap and then through said venturi throat, the resulting snow and air mixture is accelerated out of said outlet end of the ejector tube, and wherein said impeller includes:

a tray having a cylindrical side wall, an open top end for receiving the snow from the snow making machine, and a closed circular bottom end;

a rotatable transmission shaft extending through the center of said closed bottom end, wherein the transmission is in the form of a 90° gearbox connected to a motor;

a plurality of blades connected to said shaft and extending radially outwardly therefrom to locations proximate and spaced apart from said cylindrical side wall for regrinding the snow; and a snow outlet tube extending tangentially from said side wall to an inlet end of said snow inlet tube for accelerating the snow out of the conveying assembly.

2. The snow conveying assembly of claim 1, wherein the gap between the discharge end of the snow inlet tube and the venturi throat is adjustable.

3. The snow conveying assembly of claim 1, wherein the outlet end of said ejector tube is cylindrical for insertion into one end of a hose.

4. The snow conveying assembly of claim 1, including a plurality of impellers for receiving snow from snow making machines, each impeller having an outlet tube for carrying snow to said snow inlet tube.

* * * * *